US008324775B2

(12) United States Patent
Chen et al.

(10) Patent No.: US 8,324,775 B2
(45) Date of Patent: Dec. 4, 2012

(54) BRUSH DC MOTOR WITH REDUCTION MECHANISM

(75) Inventors: Guan-Chen Chen, Taichung (TW); Hsin-An Chiang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 267 days.

(21) Appl. No.: 12/851,423

(22) Filed: Aug. 5, 2010

(65) Prior Publication Data
US 2012/0032541 A1    Feb. 9, 2012

(51) Int. Cl.
*H02K 7/116* (2006.01)
(52) U.S. Cl. .......................................................... 310/83
(58) Field of Classification Search ................ 310/75 R, 310/90, 83; 475/149
See application file for complete search history.

(56) References Cited

U.S. PATENT DOCUMENTS 4,635,489 A * 1/1987 Imamura et al. ................. 74/7 E
4,785,688 A * 11/1988 Shiozaki et al. ............. 475/149
* cited by examiner Primary Examiner — Tran Nguyen
(74) Attorney, Agent, or Firm — Guice Patents PLLC

(57) ABSTRACT

A brush DC motor with reduction mechanism includes: a brush DC motor including a motor case, a stator section and a rotor section having a substantially cylindrical core, the stator section and the rotor section being received in the motor case; and a first reducing section drivable by the motor. The first reducing section includes a first sun gear, an external ring gear positioned around the sun gear and several planetary gears held between the external ring gear and the sun gear and engaged with the sun gear and the external ring gear. The first reducing section further includes a planetary carrier for locating the planetary gears in their true positions. Multiple parallel linear splines are formed on a circumference of the core at intervals. One end of the core with the splines formed on the circumference of the end serves as the sun gear of the first reducing section.

9 Claims, 5 Drawing Sheets

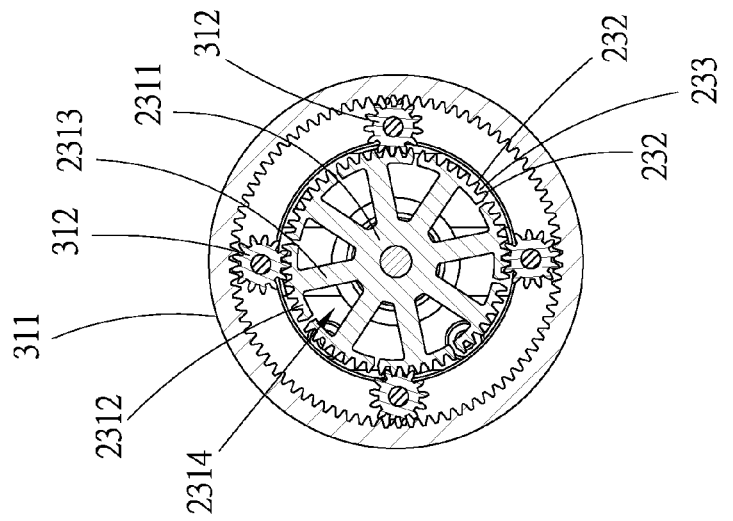
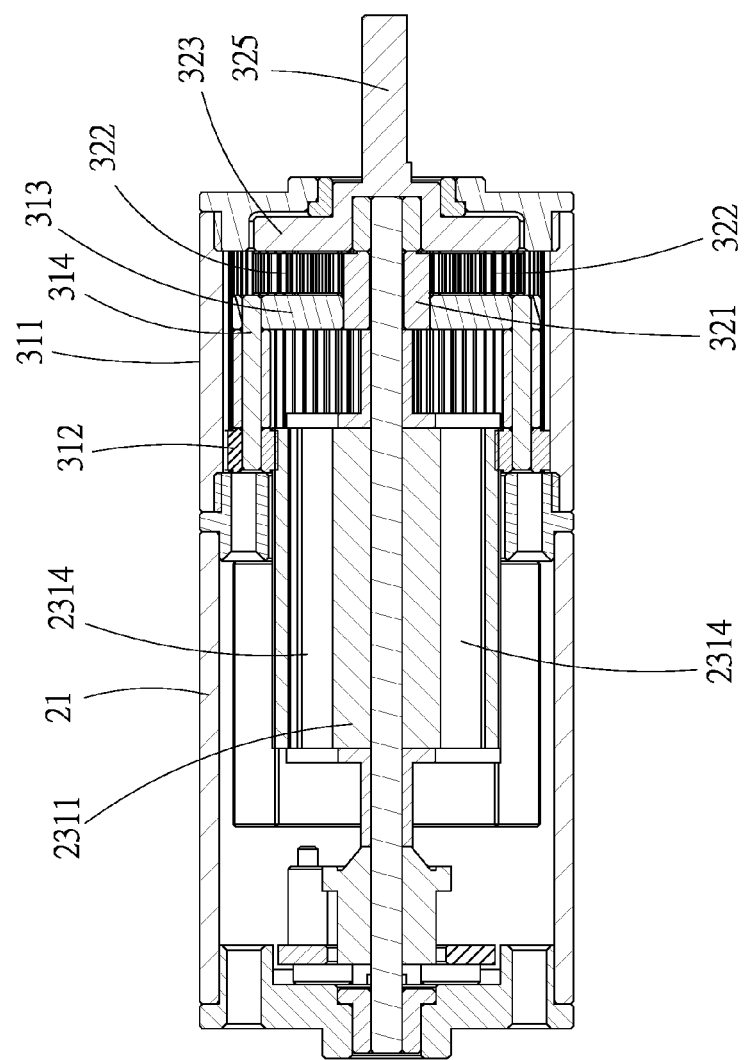
Fig. 5
Fig. 4

BRUSH DC MOTOR WITH REDUCTION MECHANISM

BACKGROUND OF THE INVENTION

1. Field of the Invention

The present invention relates generally to a motor, and more particularly to a brush DC motor with reduction mechanism.

2. Description of the Related Art

A conventional motor serves to convert electrical energy into mechanical energy. The motor can drive a load in a direct drive manner. Alternatively, in general, an independent transmission mechanism must be additionally arranged between the motor output shaft and the load. The torque output by the output shaft of the motor is adjusted and changed by the transmission mechanism and then transmitted to the load.

Conventionally, a shaft coupler or other transmission components are needed to transmit the power of the output shaft to the transmission mechanism in a relatively complicated manner. Accordingly, the power is transmitted via numerous transmission components, which abrade each other to cause a loss of part of energy. Moreover, the numerous transmission components prolong the transmission path of the power and thus lower the transmission efficiency.

In addition, the transmission mechanism is coupled with the output shaft of the motor to transmit the power thereof. However, the transmission mechanism and the motor are independent units and some components are obviously omissible for the purpose of transmission. These omissible components lead to high manufacturing and maintenance cost and will working precision. Moreover, these omissible components make it harder to fully utilize the space for the deployment.

The inventors' U.S. Pat. No. 7,211,016 discloses a brushless DC motor integrated with a reduction mechanism of planetary gear train to overcome the shortcomings existing in the prior art. It is tried by the applicant to apply the technique of the above patent to a brush DC motor as disclosed hereinafter.

SUMMARY OF THE INVENTION

It is therefore a primary object of the present invention to provide a brush DC motor with reduction mechanism, in which the reduction mechanism is integrated and arranged in a space at one end of the brush DC motor. Accordingly, the coupling structure between the brush DC motor and the reduction mechanism is simplified and compacted, whereby the brush DC motor is lightweight and easy to maintain.

It is a further object of the present invention to provide the above brush DC motor with reduction mechanism, in which the transmission path of the mechanical energy between the motor and the reduction mechanism is shortened. Under such circumstance, the loss of mechanical energy due to friction is decreased and the working efficiency is enhanced.

It is still a further object of the present invention to provide the above brush DC motor with reduction mechanism, in which the respective components of the reduction mechanism are coaxial with the rotary shaft of the brush DC motor. Therefore, the brush DC motor with the reduction mechanism can operate with better dynamic balance.

It is still a further object of the present invention to provide the above brush DC motor with reduction mechanism, in which the cogging torque and torque ripple of the brush DC motor are reduced so that the brush DC motor can operate more stably and is applicable to those fields demanding low rotational speed and high torque.

To achieve the above and other objects, the brush DC motor with reduction mechanism of the present invention includes: a brush DC motor including a hollow motor case, a stator section and a rotor section, the stator section and the rotor section being received in the motor case; and a first reducing section drivable by the motor. The first reducing section includes a first sun gear, an external ring gear positioned around the sun gear and several planetary gears held between the external ring gear and the sun gear and engaged with the sun gear and the external ring gear. The first reducing section further includes a planetary carrier for rotatably locating the planetary gears in their true positions. The rotor section has a substantially cylindrical core. Multiple linear splines are formed on a circumference of the core at intervals in parallel to each other. The splines extend along an axis of the core by a predetermined length. One end of the core with the splines formed on the circumference of the end serves as the sun gear of the first reducing section.

The present invention can be best understood through the following description and accompanying drawings, wherein:

BRIEF DESCRIPTION OF THE DRAWINGS

FIG. 4 is a sectional view taken along line a-a of FIG. 1;

FIG. 5 is a sectional view taken along line b-b of FIG. 1; and

DETAILED DESCRIPTION OF THE PREFERRED EMBODIMENT

Figure 1:
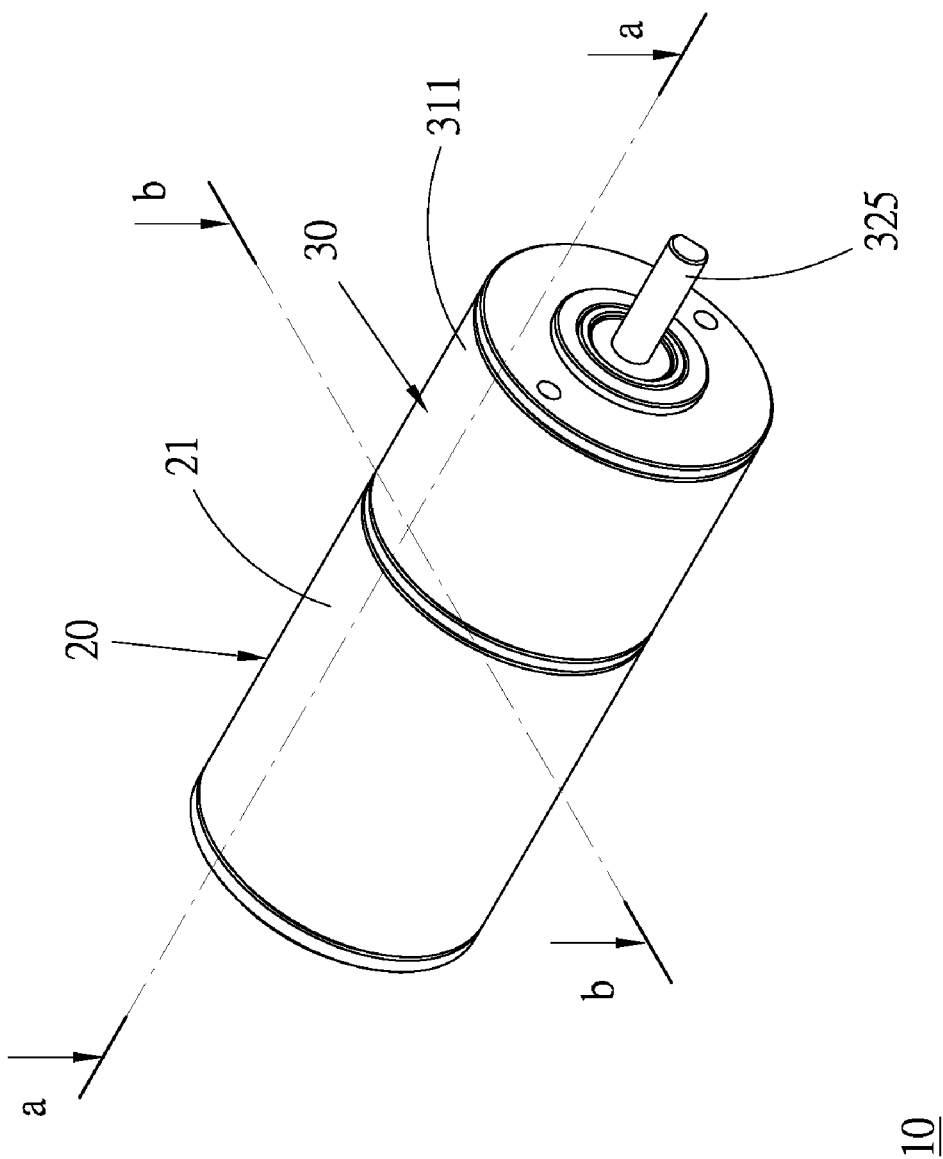
FIG. 1 is a perspective assembled view of a preferred embodiment of the present invention.
Figure 2:
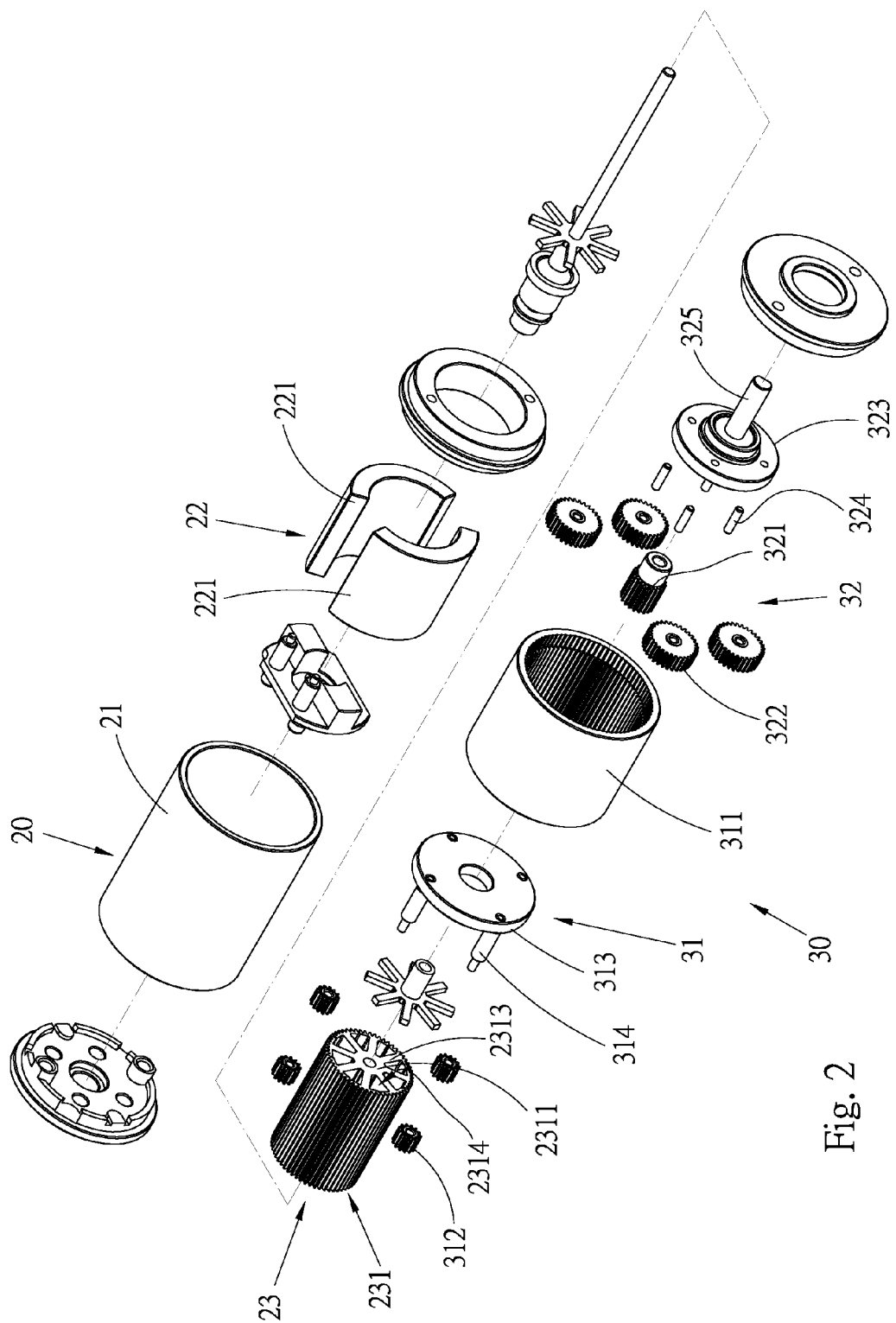
FIG. 2 is a perspective exploded view of the preferred embodiment of the present invention.
Figure 3:
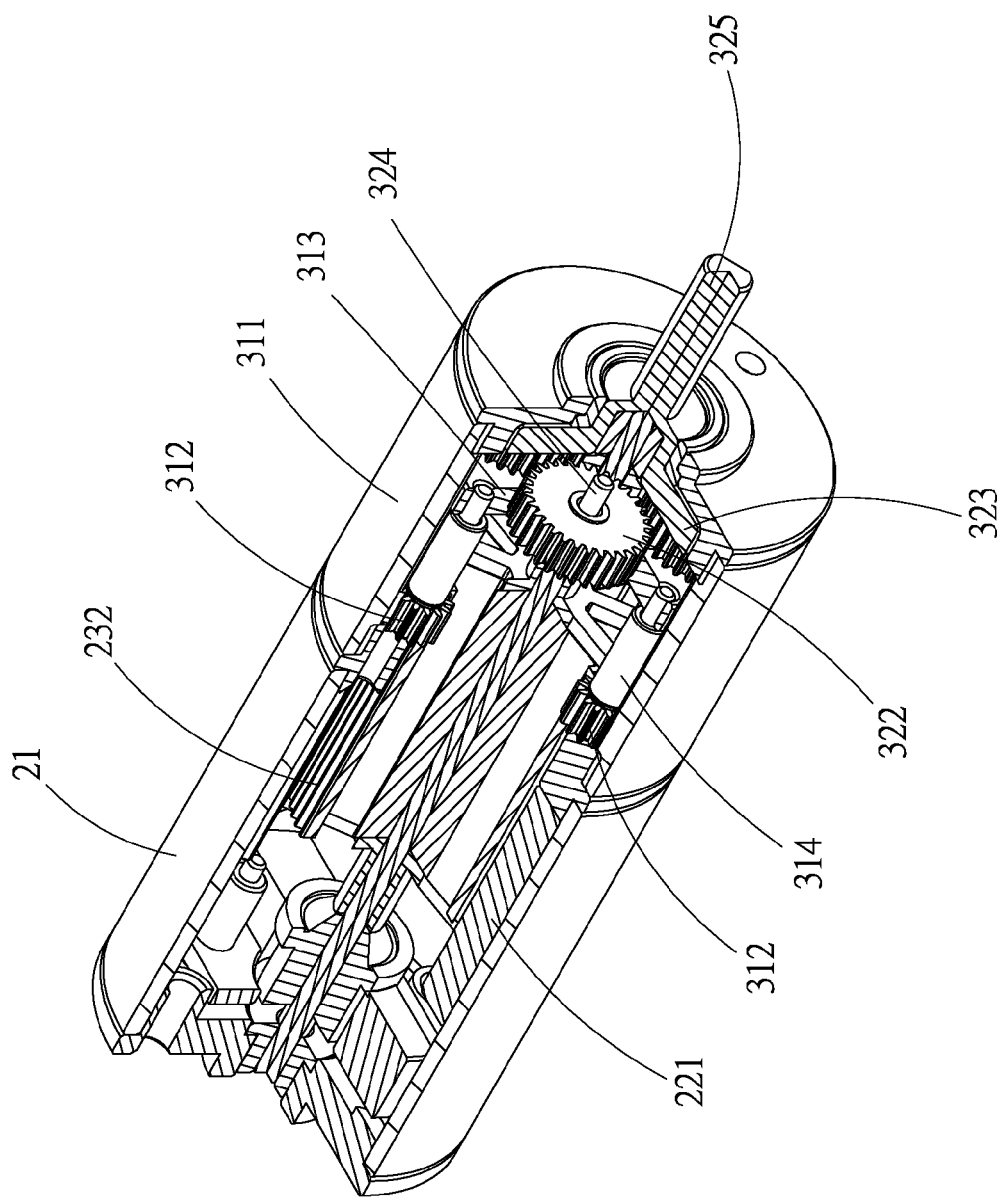
FIG. 3 is a perspective sectional view of the preferred embodiment of the present invention.
Figure 6:
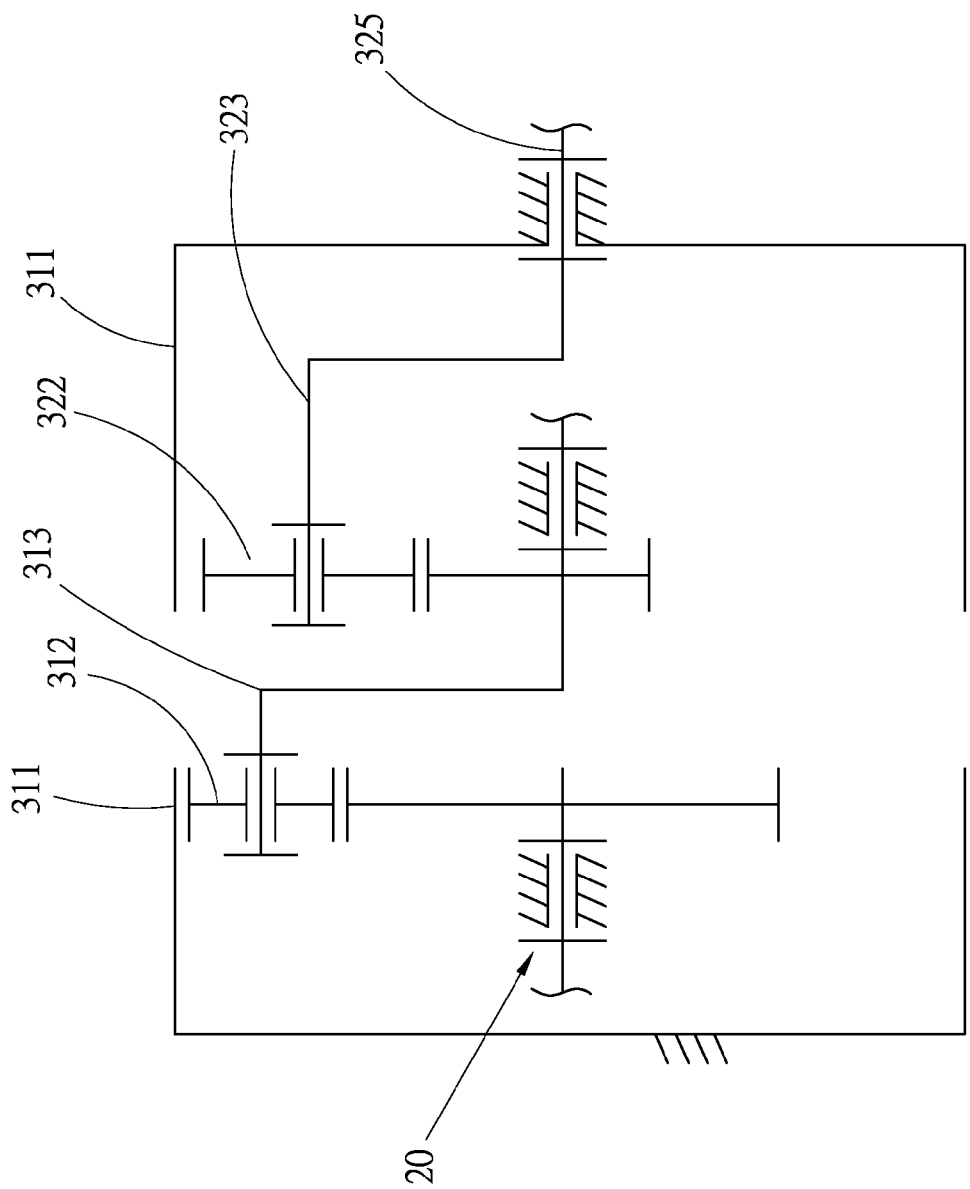
FIG. 6 is a diagram showing the deployment of the gears of the reduction mechanism of the present invention.

Please refer to FIGS. 1 to 6. According to a preferred embodiment, the brush DC motor 10 with reduction mechanism of the present invention mainly includes a brush DC motor 20 and a reduction mechanism 30.

The brush DC motor 20 is a conventional two-pole and eight-slot type permanent magnet brush DC motor. The brush DC motor 20 is composed of a motor case 21, a stator section 22 and a rotor section 23.

The motor case 21 is a tubular body with a certain inner diameter for receiving the stator section 22 and the rotor section 23 therein.

The stator section 22 includes two permanent magnets 221 in the form of arcuate pieces. The convex faces of the permanent magnets 221 are attached and affixed to inner circumference of the motor case 22. The curvature center of the permanent magnets 221 coincides with the axis of the motor case 21.

The rotor section 23 has a substantially cylindrical core 231 coaxially received in the motor case 21. One end of the core 231 extends out from one end of the motor case 21 by a certain length. The circumference of the core 231 is spaced from the inner circumference of the stator section 22 to define an air gap. Multiple linear external splines 232 are formed on the circumference of the core 231 at equal intervals in parallel to each other. The external splines 232 extend from one end of the core 231 to the other end of the core 231 along the axis thereof. The external splines 232 define therebetween multiple splineways 233.

To speak more specifically, the core 231 has a sleeve section 2311 and eight pole shoes 2312 in the form of arcuate pieces. The pole shoes 2312 are arranged around the circumference of the sleeve section 2311 at intervals. The curvature center of the pole shoes 2312 coincides with the axis of the sleeve section 2311. The gap between two adjacent pole shoes is smaller than the width of the splineway between two adjacent splines 232. Eight spoke sections 2313 are interconnected between the pole shoes 2312 and the sleeve section 2311 to fix the pole shoes 2312 in their true positions relative to the sleeve section 2311. Eight slots 2314 are defined between the adjacent spoke sections 2313 for winding coils (not shown) thereon.

According to the above arrangement, the splines 232 and the splineways 233 are positioned on the convex faces of the pole shoes 2312.

The reduction mechanism 30 includes a first reducing section 31 and a second reducing section 32. Preferably, the first and second reducing sections 31, 32 are based on the reduction technique of planetary gear train. In general, a conventional planetary gear train includes a sun gear, an outer ring gear and multiple planetary gears arranged around the sun gear and engaged between the sun gear and the external ring gear. The planetary gears are located in their true positions by means of a planetary carrier and drivable by the sun gear. The planetary carrier serves as the sun gear of a next-order reducing gear set or an output shaft. In this embodiment, the first reducing section 31 is positioned between the second reducing section 32 and the brush DC motor 20. Accordingly, the torque output from the brush DC motor 20 is first-order reduced by the first reducing section 31 and then second-order reduced by the second reducing section 32. Then the power is output from the output shaft of the second reducing section 32.

To speak more specifically, the first reducing section 31 includes a first sun gear. One end of the core 231 with the external splines 232 extends from one end of the motor case 21 to serve as the first sun gear. The first reducing section 31 further includes an external ring gear 311 with a certain length. One end of the external ring gear 311 is coaxially serially connected with one end of the motor case 21. The other end of the external ring gear 311 extends over where the second reducing section 32 is positioned. Four first planetary gears 312 are held between the first sun gear and the external ring gear 311. The first planetary gears 312 are engaged with the first sun gear and the external ring gear 311 at 90-degree intervals. A disc-like first planetary carrier 313 is coaxially positioned around one end of the core 231. The first planetary carrier 313 has several first shafts 314 for rotatably locating the first planetary gears 312 in their true positions. The first planetary carrier 313 is drivable to rotate about its own curvature center.

The second reducing section 32 has a second sun gear 321. The second sun gear 321 is coaxially fixedly inlaid in a central shaft hole of the first planetary carrier 313 and synchronously rotatable with the first planetary carrier 313. Four second planetary gears 322 are engaged between the second sun gear 321 and the external ring gear 311 at 90-degree intervals. A disc-like second planetary carrier 323 has four second shafts 324 for rotatably locating the second planetary gears 322 in their true positions. The second planetary carrier 323 is drivable to rotate about its own curvature center. One end of an output shaft 325 is fixedly connected to the second planetary carrier 323 at its curvature center. The other end of the output shaft 325 extends out by a certain length to serve as a power output section.

It should be noted that the external ring gear 311 is commonly used by both the planetary gear trains of the first and second reducing sections 31, 32.

According to the above arrangement, the brush DC motor 20 of the present invention serves to convert electrical energy into mechanical energy. The reduction mechanism 30 is directly connected with the brush DC motor 20 to reduce rotational speed and increase torque. In this case, the brush DC motor 10 with reduction mechanism of the present invention is applicable to those fields demanding low rotational speed and high torque.

According to the above preferred embodiment, the brush DC motor 10 with reduction mechanism of the present invention is mainly characterized in that the sun gear of the planetary gear train is directly integrated with the pole shoes of the core of the brush DC motor 20. The number of the splines of the sun gear is an integer multiple of the number of the slots 2314. The reduction mechanism 30 is integrated and arranged in a space at one end of the brush DC motor 20.

Accordingly, the brush DC motor 10 with reduction mechanism of the present invention has a simplified structure and is lightweight and easy to maintain.

Moreover, the reduction mechanism 30 is directly integrated with the brush DC motor 20. Therefore, the number of components is reduced and the transmission path of the mechanical energy is shortened. Under such circumstance, the loss of mechanical energy due to friction is decreased.

Furthermore, the respective components of the reduction mechanism 30 are coaxial with the rotary shaft of the brush DC motor 20. Therefore, the brush DC motor 10 with reduction mechanism of the present invention can operate with better dynamic balance.

In addition, the splineways 233 change the width of the air gap so as to create different magnetic flux values. This can lower the cogging torque and torque ripple of the brush DC motor 10 with reduction mechanism of the present invention. In this case, with the better dynamic balance, the brush DC motor 10 with reduction mechanism of the present invention can more stably operate.

The above embodiment is only used to illustrate the present invention, not intended to limit the scope thereof. Many modifications of the above embodiment can be made without departing from the spirit of the present invention.

What is claimed is:

1. A brush DC motor with reduction mechanism, comprising:
  a brush DC motor including a hollow motor case, a stator section and a rotor section, the stator section and the rotor section being received in the motor case; and
  a first reducing section drivable by the motor, the first reducing section including a first sun gear, an external ring gear positioned around the sun gear and several planetary gears held between the external ring gear and the sun gear and engaged with the sun gear and the external ring gear, the first reducing section further including a planetary carrier for rotatably locating the planetary gears in respective true positions thereof, wherein the rotor section has a substantially cylindrical core, multiple linear splines being formed on a circumference of the core at intervals in parallel to each other, the splines extending along an axis of the core by a predetermined length, one end of the core with the splines formed on the circumference of the end serving as the sun gear of the first reducing section;

wherein the core has a sleeve section and multiple pole shoes in the form of arcuate pieces, the pole shoes being arranged around a circumference of the sleeve section at intervals, a curvature center of the pole shoes coinciding with an axis of the sleeve section, multiple spoke sections being interconnected between the sleeve section and concave faces of the pole shoes, several slots being defined between the adjacent spoke sections.

2. The brush DC motor with reduction mechanism as claimed in claim 1, wherein the splines of the rotor section are formed on convex faces of the pole shoes and extend from one end of the core to the other end of the core along the axis thereof, each two adjacent splines defining therebetween a splineway, the splineways serving to change magnetic flux of air gap so as to reduce cogging torque of the motor.

3. The brush DC motor with reduction mechanism as claimed in claim 1, wherein the number of the splines is an integer multiple of the number of the slots.

4. The brush DC motor with reduction mechanism as claimed in claim 1, wherein a gap between two adjacent pole shoes is smaller than a width of the splineway between two adjacent splines.

5. The brush DC motor with reduction mechanism as claimed in claim 1, wherein the motor case is a tubular body and the external ring gear is coaxially serially connected with one end of the motor case.

6. The brush DC motor with reduction mechanism as claimed in claim 5, wherein one end of the core extends out from one end of the motor case.

7. The brush DC motor with reduction mechanism as claimed in claim 1, wherein the number of the planetary gears of the first reducing section is four, the four planetary gears being engaged with the sun gear and the external ring gear at 90-degree intervals.

8. A brush DC motor with reduction mechanism, comprising:
   a brush DC motor including a hollow motor case, a stator section and a rotor section, the stator section and the rotor section being received in the motor case; and
   a first reducing section drivable by the motor, the first reducing section including a first sun gear, an external ring gear positioned around the sun gear and several planetary gears held between the external ring gear and the sun gear and engaged with the sun gear and the external ring gear, the first reducing section further including a planetary carrier for rotatably locating the planetary gears in respective true positions thereof, wherein the rotor section has a substantially cylindrical core, multiple linear splines being formed on a circumference of the core at intervals in parallel to each other, the splines extending along an axis of the core by a predetermined length, one end of the core with the splines formed on the circumference of the end serving as the sun gear of the first reducing section;
   wherein the motor case is a tubular body and the external ring gear is coaxially serially connected with one end of the motor case;
   wherein one end of the core extends out from one end of the motor case.

9. The brush DC motor with reduction mechanism as claimed in claim 8, wherein the number of the planetary gears of the first reducing section is four, the four planetary gears being engaged with the sun gear and the external ring gear at 90-degree intervals.

\* \* \* \* \*